Oct. 30, 1934.   F. M. MORTON   1,979,007
SELF LUBRICATING BOBBIN GEAR
Filed April 2, 1934
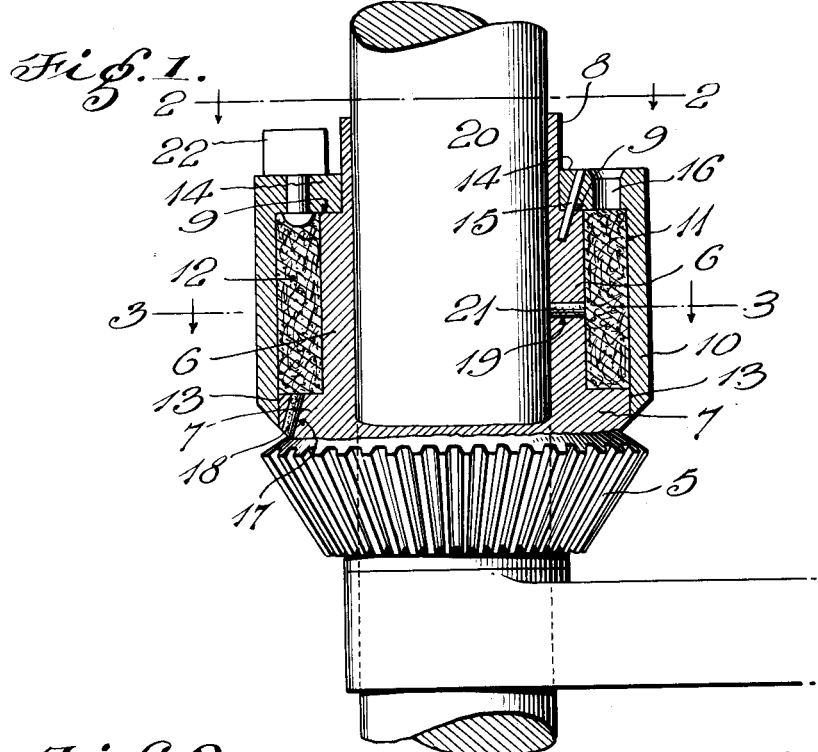
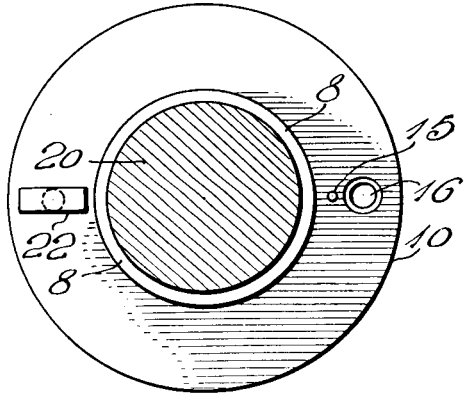
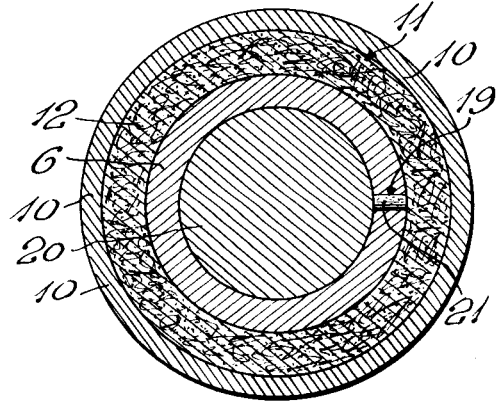
Witness
H. Woodard
Inventor
Frank M. Morton
By H. B. Willson & Co
Attorneys.

Patented Oct. 30, 1934

1,979,007

UNITED STATES PATENT OFFICE 1,979,007

SELF-LUBRICATING BOBBIN GEAR

Frank M. Morton, Phenix City, Ala.

Application April 2, 1934, Serial No. 718,718

8 Claims. (Cl. 74—468)

The invention relates to bobbin gears used on fly frames and the like, and it aims to provide an exceptionally simple and inexpensive construction which will effectively answer lubricating requirements, and in carrying out this end, a further object is to provide for supplying lubricant directly to the teeth of the gear.

With the foregoing in view, the invention resides in the novel subject matter hereinafter described and claimed, description being accomplished by reference to the accompanying drawing.

Fig. 1 is a vertical sectional view partly in elevation showing the self-lubricating gear upon its spindle.

Figs. 2 and 3 are horizontal sectional views on the lines 2—2 and 3—3 respectively of Fig. 1.

A preferred construction has been shown and will be specifically described, with the understanding however, that within the scope of the invention as claimed, minor variations may be made.

The beveled gear 5 is provided with an upstanding integral hub 6, said hub having a circumferential enlargement 7 contiguous to and preferably integral with the gear 5 and being provided at its upper end with a circumferential reduction 8 providing an upwardly facing shoulder 9. A sleeve 10 surrounds and is spaced from the hub 6 to provide a lubricant chamber 11 in which oil-saturated waste or the like 12 is contained. The lower end of the sleeve 10 is open and it snugly surrounds the hub enlargement 7 as denoted at 13, whereby said enlargement 7 provides a bottom for the lubricant chamber 11. The upper end of the sleeve 10 is provided with an integral inwardly projecting contiguous flange 14 which snugly surrounds the hub reduction 8 and rests solidly upon the shoulder 9, providing a closure for the upper end of the lubricant chamber 11. A tight-fitting pin 15 is preferably driven through an opening in the flange 14 into a corresponding opening in the hub 6 to secure the sleeve 10 and its flange upon said hub, and said flange is formed with an opening 16 for introducing oil to the chamber 11. From this chamber, one oil conducting passage 17 extends to the upper ends of the teeth of the gear 5, said passage being formed through the hub enlargement 7 and containing an appropriate wick or the like 18 to regulate the discharge of oil to the gear teeth. Another lubricant passage 19 is formed through the hub 6 to conduct oil from the chamber 11 to the interior of said hub to lubricate the surface of the latter which rotates upon the spindle 20. A wick or the like 21 is held in the passage 19 to regulate the flow of oil.

The part 22 is merely a driving lug for the bobbin (not shown), said lug being carried by the flange 14.

It will be seen from the foregoing that I have provided exceptionally simple and inexpensive, yet efficient means, for supplying needs of lubrication, and it will be observed that due to the smooth, cylindrical exterior of the sleeve, no threads or waste from the machine will wind around the same to give trouble while the gear is in operation.

While the details disclosed are preferably followed, as above stated, attention is again invited to the possibility of making minor variations within the scope of the invention as claimed.

I claim:—

1. An assemblage of the class described comprising a gear having an upstanding hub to surround a spindle, and means surrounding said hub and co-operating therewith in forming a lubricant chamber whose bottom is disposed directly at the upper ends of the gear teeth, said bottom having a lubricant outlet for feeding lubricant from said chamber to said gear teeth.

2. An assemblage of the class described comprising a gear having an upstanding hub to surround a spindle, and means surrounding said hub and co-operating therewith in forming a lubricant chamber whose bottom is disposed directly at the upper ends of the gear teeth, said bottom having a lubricant outlet for feeding lubricant from said chamber to said gear teeth, said hub having a lubricant passage for feeding lubricant to its interior from said chamber.

3. An assemblage of the class described comprising a gear having an upstanding hub to surround a spindle, said hub having a circumferential enlargement contiguous to said gear, a sleeve surrounding and spaced from said hub to provide a lubricant chamber, the lower end of said sleeve being engaged substantially fluid-tightly with said hub enlargement whereby the latter forms a bottom for said chamber, and a closure for the top of said chamber, said hub enlargement having a lubricant passage for feeding lubricant from said chamber to the teeth of said gear.

4. An assemblage of the class described comprising a gear having an upstanding hub to surround a spindle, said hub having a circumferential enlargement contiguous to said gear, a sleeve surrounding and spaced from said hub to provide a lubricant chamber, the lower end of said sleeve being engaged substantially fluid-tightly with said hub enlargement whereby the latter forms a bottom for said chamber, and a closure for the top of said chamber, said hub having a lubricant passage leading to its interior from said chamber.

5. An assemblage of the class described comprising a gear having an upstanding hub to surround a spindle, said hub having a circumferential enlargement contiguous to said gear, a sleeve surrounding and spaced from said hub to provide a lubricant chamber, the lower end of said sleeve being engaged substantially fluid-tightly with said hub enlargement whereby the latter forms a bottom for said chamber, and a closure for the top of said chamber, said hub enlargement having a lubricant passage for feeding lubricant from said chamber to the teeth of said gear, said hub also having a lubricant passage leading to its interior from said chamber.

6. An assemblage of the class described comprising a gear having an upstanding hub to surround a spindle, said hub having a circumferential enlargement contiguous to said gear, and a circumferential reduction at its upper end, the latter providing an upwardly facing shoulder, a sleeve surrounding and spaced from said hub to provide a lubricant chamber, said sleeve having an open lower end snugly surrounding said enlargement whereby the latter forms a bottom for said chamber, the upper end of said sleeve being provided with an inwardly projecting flange snugly surrounding said reduction and resting upon said shoulder to form a closure for the upper end of said chamber, said hub enlargement having a lubricant passage for feeding lubricant from said chamber to the teeth of said gear.

7. An assemblage of the class described comprising a gear having an upstanding hub to surround a spindle, said hub having a circumferential enlargement contiguous to said gear, and a circumferential reduction at its upper end, the latter providing an upwardly facing shoulder, a sleeve surrounding and spaced from said hub to provide a lubricant chamber, said sleeve having an open lower end snugly surrounding said enlargement whereby the latter forms a bottom for said chamber, the upper end of said sleeve being provided with an inwardly projecting flange snugly surrounding said reduction and resting upon said shoulder to form a closure for the upper end of said chamber, said hub having a lubricant passage leading to its interior from said chamber.

8. An assemblage of the class described comprising a gear having an upstanding hub to surround a spindle, said hub having a circumferential enlargement contiguous to said gear, and a circumferential reduction at its upper end, the latter providing an upwardly facing shoulder, a sleeve surrounding and spaced from said hub to provide a lubricant chamber, said sleeve having an open lower end snugly surrounding said enlargement whereby the latter forms a bottom for said chamber, the upper end of said sleeve being provided with an inwardly projecting flange snugly surrounding said reduction and resting upon said shoulder to form a closure for the upper end of said chamber, said hub enlargement having a lubricant passage for feeding lubricant from said chamber to the teeth of said gear, said hub also having a lubricant passage leading to its interior from said chamber.

FRANK M. MORTON.